United States Patent Office 2,858,349
Patented Oct. 28, 1958

2,858,349

PROCESS FOR AVERAGING HYDROCARBONS

Carl B. Linn, Riverside, Ill., assignor to Universal Oil Products Company, Des Plaines, Ill., a corporation of Delaware No Drawing. Application April 27, 1955
Serial No. 504,380

11 Claims. (Cl. 260—672)

This invention relates to a process for converting hydrocarbon mixtures comprising components of higher and lower molecular weight than the average molecular weight of the mixture to form hydrocarbons of intermediate molecular weight. More specifically, the process of the present invention concerns a method for converting hydrocarbons of the alkyl aromatic and aliphatic series in the presence of a specific type of catalyst which is particularly effective for hydrocarbon conversion processes of this class whereby hydrocarbons of intermediate molecular weight within the upper and lower limits of the components comprising the mixed hydrocarbon feed are formed as a product of the conversion.

It is well known that natural sources of hydrocarbons, such as crude petroleum and the products of many hydrocarbon conversion reactions, such as cracking, polymerization, alkylation, reforming etc. Yield products of both higher and lower molecular weight and boiling point than may be desired, as for example, when a gasoline boiling range fraction having certain volatility requirements is desired. In many instances the product contains components boiling higher than the desired boiling range because of the passage through the reaction zone of refractory hydrocarbons which escape conversion. In other instances higher molecular weight products of the conversion may be produced as a result of side reactions which yield components of higher molecular weight than the principal or desired product of the process. Such products are often otherwise useless except for their possible use as recycle material to the principal conversion reaction and when such products are refractory or are not readily converted by the method utilized, these materials represent an economic waste, or otherwise represent by-products having lesser utility and are therefore of lesser value than the desired end product. One of the principal objects of this invention is to utilize materials of such higher boiling point as a charging stock in the present process and convert the same to materials of lower molecular weight, more suitable for a specific use, such as, a hydrocarbon fraction for use as gasoline. Another object of the invention is to convert materials of relatively low boiling point into hydrocarbons of higher boiling point, as in the conversion of normally gaseous hydrocarbons into liquid hydrocarbons of the gasoline boiling range. Still another object of the invention is to provide a process for effecting disproportionation reactions in the presence of a particularly effective catalytic agent therefor which effects the desired conversion by an efficient means and which conserves the charging stock and product of the process.

In one of its embodiments the present invention relates to a process for effecting the disproportionation of a mixture of hydrocarbons comprising components of both higher and lower molecular weight than the desired product of intermediate molecular weight which comprises reacting said mixture at disproportionation reaction conditions in the presence of a catalyst comprising a complex of a boron trihalide and a metal halide salt selected from the iron group metals and the metals of the left-hand columns of groups IV, V, VI and VII of the periodic table.

A more specific embodiment of the present invention concerns the production of a monoalkyl-substituted aromatic hydrocarbon which comprises reacting a dialkyl-substituted aromatic hydrocarbon with an aromatic hydrocarbon free of nuclear substituents at a temperature of from about −20° to about 150° C. in the presence of a catalyst comprising a complex of boron trifluoride, ferrous fluoride and hydrogen fluoride, said catalyst containing at least 1 mol of hydrogen fluoride per molar equivalent of boron trifluoride and ferrous fluoride.

The use of boron trifluoride and hydrogen fluoride either individually or in admixture for effecting disproportionation reactions of hydrocarbons is well known, and it is also well known that these catalysts cause side reactions among the hydrocarbons charged to the disproportionation reaction and that a substantial portion of the charge stock undergoes hydrogen and alkyl transfer reactions which lead to the formation of highly unsaturated, high molecular weight hydrocarbon by-products. These by-products generally combine with the catalyst to form a sludge-like material, generally considered to be a waste product of the process. It has now been found that boron halides may be combined with certain metal halides, hereinafter described, to form a catalytic complex or catalyst composition which effects such disproportionation reactions more efficiently and in which the yield of side reaction products is substantially reduced. It has also been found that the complex of the boron halide with the metal halide may be combined in certain proportions with hydrogen halide to provide a particularly effective catalyst composition for effecting such disproportionation reactions. These observations relating to the activity of boron halide-metal halide and boron halide-metal halide-hydrogen halide complexes in promoting disproportionation reactions have shown that the present catalyst composition yields products substantially different from the products obtained in the use of boron halides, metal halides or hydrogen halides individually or even with mixtures of boron halide and hydrogen halide, the most significant differences being in the yields and in the structure of the desirable products formed. On the basis of results obtained in disproportionation reactions with the present catalyst and based on observations of its physical and chemical properties it is believed that the catalyst composition is a peculiar association of the boron trihalide and the metal halide and that if the catalyst contains a hydrogen halide, the latter also enters into the complex. This conclusion is indicated by the fact that the vapor pressures of the hydrogen halide and boron halide when these are combined in the form of the catalyst complex are substantially less than the vapor pressures of the individual compounds.

Furthermore, it is believed that the disproportionation reaction of the present process and the character of the products obtained therefrom are directly the consequence of the peculiar catalytic properties of the catalyst complex as a whole, aside from the catalytic properties of the individual components of the complex or of any combination of two of the components.

Contemplated within the scope of the present invention are disproportionation reactions effected in the presence of a boron trihalide-metal halide catalyst composition, the boron trihalide component of which may be selected from boron trifluoride, boron trichloride, boron tribromide and boron-tri-iodide. Although the metal halide is preferably a fluoride, chloride, bromide or iodide of an iron group metal, that is, of iron, cobalt or nickel, and more desirably a fluoride, other metal halides which may be combined with the boron halide in the catalyst composition are the fluorides, chlorides, bromides and iodides of the metals comprising the left-hand columns of groups IV, V, VI and VII of the periodic table, particularly the metals: chromium, molybdenum, tungsten, titanium, manganese, vanadium and zirconium, the fluorides and chlorides of these metals being particularly preferred because of their generally greater activity in the process when combined with a boron halide, which is preferably boron trifluoride. In general, it is also preferred that the halogen ion of the catalyst composition ingredients be the same for each of the ingredients, that is, when boron trifluoride, for example, is utilized in preparing the catalyst composition, it is preferable that the metal halide likewise be a fluoride and that the hydrogen halide component, when utilized in the preparation of the catalyst composition is also hydrogen fluoride. It is to be emphasized, however, that the halides utilized in the preparation of the catalyst need not necessarily contain the same halogen ion and that the halides entering into the catalyst composition may be heterogeneous halides without materially affecting the activity of the catalyst composition.

Any suitable method may be utilized in the preparation of the present catalyst composition. In accordance with one convenient method of preparation, the hydrogen halide, for example, hydrogen fluoride, is reacted with the metal constituting the metal halide salt in the composition, for example iron, preferably in its powdered form, to yield the corresponding metal halide, and the latter then reacted with the boron trihalide, such as boron trifluoride, to form one embodiment of the complex. In another method of preparation, the hydrogen halide and boron trihalide are mixed and the resulting mixture thereafter contacted with the metal which will form the metal halide component of the catalyst composition at reaction conditions resulting in the reaction of the metal with the hydrogen halide. In either method of preparation, it is desirable that an excess of the hydrogen halide be present in the reaction mixture during the addition of the boron trihalide. In the preparation of the preferred catalyst compositions utilizable in the present invention, in which the hydrogen halide is present as a distinct component of the catalyst complex, the hydrogen halide is desirably supplied to the catalyst-forming reactor in a molar excess above that which will stoichiometrically react with the metal supplied thereto, such that the resulting catalyst composition contains an excess of the hydrogen halide over that required to form the metal halide during the catalyst preparation. For most purposes, an equimolar ratio of the metal halide and the boron trihalide is sufficient to form a catalyst composition of the desired activity, although either component may be varied within the range of from about 0.1 to about 10 mols of boron trihalide per mol of the metal halide, it being essential only that a sufficient amount of both the metal halide and the boron trihalide be present to form a substantial concentration of the complex thereof in the composition. As previously indicated the preferred compositions also contain the hydrogen halide in combination with the boron trihalide-metal halide complex and preferably from about 0.1 to 1 to about 150 to 1 mols of hydrogen halide per mol of boron trihalide-metal halide complex. In general, the greater the molar ratio of hydrogen halide to metal halide-boron trihalide complex present in the composition, the greater will the ultimate yield of disproportionation products be when recovered from a reaction catalyzed with the present catalyst composition and generally the character of the product will be more desirable, comprising components having more branched-chain structure, in the case of the aliphatic hydrocarbon charging stock.

The complex formed as indicated above is a solid, although a liquid form of the catalyst may be provided by dissolving the solid in an excess of liquid, anhydrous hydrogen halide. The solubility of the complex in the liquid hydrogen halide, however, is relatively low and therefore an excess of the hydrogen halide substantially greater than the amount required to form the complex itself is essential to provide a solution containing any substantial amount of the complex in a particular reaction zone. Under most circumstances, therefore, the catalyst phase will comprise a mixture of solid complex in an excess of liquid hydrogen halide and such excess will ordinarily be preferred in effecting most disproportionation reactions of the type herein provided. The catalyst may also be provided in a solid form by depositing the boron trihalide-metal halide-hydrogen halide catalyst complex on a suitable inert solid supporting material, preferably a porous support, such as activated charcoal. Other supports which are non-reactive with the hydrogen halide or other constituents of the catalyst composition include certain metal fluorides, such as aluminum fluoride, calcium fluoride, magnesium fluoride etc. and when hydrogen chloride or hydrogen bromide are utilized as the hydrogen halide ingredient of the catalyst composition, porous silica may likewise be employed as a solid support. Generally such supported catalyst compositions are formed by depositing the catalyst composition while in the form of a solution within a suitable solvent on the solid supporting material and thereafter evaporating the solvent from the mixture of support and catalyst composition. The principal requirement of the solid material which makes it suitable as a support for the catalyst composition is its inertness with components of the catalyst composition and its insolvency in the stream of reactants entering the disproportionation reaction zone.

As hereinabove indicated, the preferred catalyst composition of this invention contains a hydrogen halide, preferably hydrogen fluoride, although all or a portion of the hydrogen halide may be replaced by certain alkyl halides, including the fluorides, chlorides, bromides and iodides, preferably in admixture with a significant amount of the hydrogen halide. Suitable specific alkyl halides for this purpose include methyl fluoride, ethyl fluoride, isopropyl fluoride, n-propyl fluoride, butyl fluoride, amyl fluoride, hexyl fluoride and the various isomers thereof containing up to about 6 carbon atoms; methyl chloride, ethyl chloride, propyl chloride etc.; methyl iodide, ethyl iodide, propyl iodide etc. methyl bromide, ethyl bromide, propyl bromide etc. and homologues and isomers thereof containing up to about 6 carbon atoms, as well as mixtures of 2 or more of the above individual halides. Other halogen substituted compounds may similarly be used, including the polyhalogen substituted alkanes and the mono- and polyhalogen substituted cyclic hydrocarbon compounds, such as difluorobenzene, etc., although the various compounds enumerated above are not necessarily utilized with equivalent results.

As heretofore indicated, the present invention concerns a process for effecting disproportionation reactions in the presence of the specified catalysts described above, that is, a catalyst composition comprising a complex of a boron trihalide and a metal halide preferably combined with a hydrogen halide. As utilized herein, the term "disproportionation" refers to hydrocarbon reactions involving the transfer of a hydrogen or alkyl radical between a mixture of hydrocarbon reactants comprising components which differ in molecular weight at disproportionation reaction conditions. The reaction may thus also be considered as an alkyl or hydrogen transfer or averaging reaction, yielding a product the molecular weight of which is intermediate the molecular weights of the individual hydrocarbons comprising the mixed hydrocarbon feed stock. Disproportionation, therefore, may be effected between a mixture of aromatic hydrocarbons, one component of which is an aromatic hydrocarbon containing no alkyl substituents or fewer than one less the number of alkyl substituents nuclearly substituted on the other aromatic reactant and the other reacting component of which contains at least 2 alkyl substituents to yield an alkyl aromatic hydrocarbon containing an intermediate number of alkyl substituents, as for example, in a disproportionation reaction between benzene and xylene to yield toluene as one of the products. In a further application of the present process to aromatic hydrocarbons, the feed stock may consist of a mixture of aromatic hydrocarbons in which one of the components contains a short chain alkyl group or no alkyl group whatever and the other component contains a relatively longer chain alkyl group, the process resulting in the production of a short chain nuclearly alkyl-substituted aromatic hydrocarbon, the alkyl group or groups of which are derived from the longer chain alkyl-substituted aromatic hydrocarbon reactant. The reaction may also be applied to mixtures of aliphatic hydrocarbons, the individual components of the mixture containing at least 3 carbon atoms per molecule in order to form 1 or more aliphatic hydrocarbons of intermediate molecular weight. Thus, a mixture of butane and dodecane may be reacted at disproportionation reaction conditions in the presence of the instant catalyst composition to form a mixture comprising mainly octanes. The reaction is conveniently carried out with aliphatic hydrocarbon mixtures containing from 3 to about 30 carbon atoms per molecule and generally the product, when reacting a mixture of aliphatic hydrocarbons in which the individual components differ by more than 2 carbon atoms, is a mixture of aliphatic hydrocarbons of intermediate molecular weight, as for example in the disproportionation of a mixture of butanes and octanes the product comprises not only $C_6$ aliphatic components, but usually also $C_5$ and $C_7$ intermediates, together with various hydrocarbons of lower and higher molecular weights.

It is generally preferred, in the disproportionation of aliphatic hydrocarbons to utilize a feed stock containing at least a small proportion of olefinic components, the latter hydrocarbons tending to promote favorably the desired disproportionation of the paraffinic reactants. The charge stock to the process may also comprise a mixture of alkyl aromatic hydrocarbons and aliphatic hydrocarbons to produce a mixture in which the aliphatic side chains on the aromatic nucleus are of longer chain length than the alkyl aromatic hydrocarbon charged to the process. Still another class of hydrocarbons which undergo disproportionation in the presence of the catalyst compositions herein provided at suitable reaction conditions are the cycloaliphatic or naphthenic hydrocarbons, such as a mixture of dimethylcyclohexane and cyclohexane which is converted in large measure to methylcyclohexane, or a mixture of propylcyclohexane and cyclohexane which yields mono-, and dimethylcyclohexanes at disproportionation reaction conditions.

The disproportionation or averaging reaction of the present process is conveniently effected at temperatures of from about —20° to about 150° C. and at atmospheric or superatmospheric pressures, up to about 100 atmospheres, depending upon the temperature utilized in the process and the character of the charge stock. In general it is preferred that at any specific temperature, the pressure be maintained at a value sufficient to maintain the reactants and hydrogen halide in substantially liquid phase and to prevent dissociation of the solid catalyst complex into its volatile components although the process is not necessarily limited to liquid phase conditions.

In most instances it is preferred to supply sufficient catalyst to the reaction zone to convert a major proportion of the charge stock, although the latter may be recycled to the reaction zone after separating the unconverted reactants from the reaction product. Generally, therefore, the catalyst is preferably supplied to the reaction zone in an amount sufficient to provide a weight ratio of catalyst complex to hydrocarbon charge stock of at least 0.005 to 1 and preferably from about 0.01 to 1 to about 0.1 to 1.

The process may be conducted utilizing various types of flow arrangements between the catalyst and the mixture of hydrocarbons comprising the feed stock, one of the preferred methods for effecting the reaction utilizing a solid or supported catalyst comprising passing the mixed hydrocarbon feed stock over a fixed bed of the catalyst in the reactor. Where the catalyst and the hydrocarbon feed are in liquid phase, the preferred method for effecting the reaction is by contacting the charge stock and catalyst in an autoclave type of reactor containing a stirring device, such as a motor driven paddle, the autoclave being closed to permit the use of superatmospheric pressures. Hydrogen may be charged into the reaction mixture in order to eliminate at least to a certain extent hydrogen transfer and cracking reactions, particularly when the process is effected at a high temperature level within the range specified above.

It is often desirable to introduce continuously into the reaction zone hydrogen halide, boron halide, or both, to compensate for such loss of those components as may occur in the normal operation of the process. The catalyst may generally be recovered from such a process in substantially unaltered condition and may be readily recycled in the process.

The present invention is further illustrated with respect to several of its embodiments in the following examples, which, however, are not intended to limit the scope of the invention necessarily in accordance therewith.

Example I

A catalyst complex composition of the type herein provided may be prepared in accordance with the general method specified above by placing 28 grams of iron powder and 88 grams of anhydrous hydrogen fluoride in a copper-lined, steel autoclave, heating the autoclave and its contents for about ½ hour at a temperature of about 100° C. as the autoclave is rotated, thereafter allowing the reactor to cool and releasing hydrogen formed during the reaction. Boron trifluoride in the amounts of 61 grams is then pressured into the autoclave, followed by rotating the autoclave for approximately 20 hours at 23° C. The complex catalyst is thereafter recovered from the autoclave as a white solid, analyzing 7.6% boron and 34.5% iron, compared to a calculated analysis for $FeF_2 \cdot BF_3$ of 34.6% iron and 7.6% of boron. The fluorine content cannot ordinarily be determined accurately in the presence of boron.

The catalyst complex as prepared above is utilized in an "averaging" reaction as follows: into a 1 liter autoclave equipped with a pressure sealed mechanical stirrer is sealed 50 grams of $FeF_2 \cdot BF_3$ and 200 grams of a mixture of isomeric dodecanes. 200 grams of hydrogen fluoride and 125 grams of isobutane are next added and the mixture stirred at 30° C. for 15 hours. After separating the hydrocarbon product from the catalyst, the former is found to consist of 40% of hydrocarbons boiling in the octane range.

In a similar experiment except that the $FeF_2 \cdot BF_3$ is omitted little interaction of the dodecanes and the butane occurs and less than 10% of octane boiling range material is recovered.

Example II

A catalyst of the formula $CrF_2 \cdot BF_3$ was prepared as follows: 26 grams of chromium powder and 55 grams of hydrogen fluoride were placed in a copper-liner and sealed into an 850 cc. rotating Ipatieff autoclave. 48 grams of boron trifluoride was pressured in and the autoclave rotated at 100° C. for 1 hour. After cooling, the pressure was released and the calculated amount of hydrogen obtained as demanded by the equation:

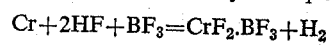

$$Cr + 2HF + BF_3 = CrF_2 \cdot BF_3 + H_2$$

The catalyst as recovered was a green powder which dissolved in water with violence when added thereto.

The above prepared catalyst complex is utilized in the following reactions for "averaging" petroleum stocks. Into a 1 liter autoclave equipped with a pressure sealed stirring device is charged 50 grams of the above prepared chromium salt, 150 ml. of isomeric decanes, 150 ml. of isopentane, and 100 grams of hydrogen fluoride. After contacting 6 hours at 40° C. the autoclave is discharged, the hydrocarbon product separated and found by distillation to consist mainly of hydrocarbons boiling intermediate between pentane and decane. About 20% of the pentane and decane charged is recovered and is suitable for recycling to the process.

Example III

The catalyst $FeF_2 \cdot BF_3$, prepared as in Example I, is contacted for 5 hours with a mixture of xylene and benzene containing 2 molar proportions of xylene per mol of benzene in a copper-lined pressure autoclave at a temperature of 40° C. together with two parts by weight of hydrogen fluoride for each $FeF_2 \cdot BF_3$ part charged. The hydrocarbon product is recovered from the catalyst composition by decantation at temperatures below —10° C., the hydrocarbon layer being washed with water to remove dissolved hydrogen fluoride, dried, and thereafter fractionally distilled to determine the yield of toluene. Approximately 10 mol percent of the benzene is recovered and the yield of toluene is approximately 40 mol percent, based on the benzene charged. In similar reactions utilizing liquid anhydrous hydrogen fluoride and a mixture of hydrogen fluoride and boron trifluoride in a weight ratio of the hydrogen fluoride to boron trifluoride of 9 to 1, the reaction being effected at substantially the same reaction conditions as utilized above, the product contains less toluene, and more high boiling aromatics, indicating that the conversion of benzene to toluene is not as effective with HF and/or $BF_3$ catalysts individually in each instance as with the catalyst complex of this invention.

Example IV

A catalyst complex comprising a compound of manganous bromide and boron bromide is prepared as follows:

In a copper-liner for an 850 cc. rotating Ipatieff autoclave is placed 20 grams of powdered manganese and 100 grams of boron tribromide. After sealing, 70 grams of hydrogen bromide is pressured in and the autoclave heated to 100° C. for 3 hours. After cooling, excess hydrogen is released, the autoclave opened and the complex manganous salt recovered as a brown powder. 30 grams of this manganous salt is sealed into a 1 liter steel autoclave equipped with a stirring device together with a mixture of 100 grams of isopentane and 150 grams of a petroleum fraction boiling at 200–400° C. 100 grams of hydrogen bromide is next added and the autoclave contents then vigorously stirred for 15 hours at 50° C. The resulting product is then discharged into a flask at —70° C. containing 200 grams of water. The flask is warmed to 20° C., meanwhile collecting in a Dry-Ice cooled trap following a soda lime absorber liquefiable hydrocarbon gases.

Analysis shows the hydrocarbon product to have the following compositions:

| | Percent |
|---|---|
| Isobutane | 5 |
| Pentanes | 20 |
| B. P. 35–200° C. | 52 |
| Higher boiling | 15 |
| Loss, etc. | 8 |

Thus a substantial part of the high boiling charge is converted into gasoline range product by the manganous salt catalyzed "averaging" reactions.

By operating differently and not decomposing the inorganic bromides with water, the latter would be suitable for further catalytic conversion and the product boiling above 200° C. for recycle to the operation.

I claim as my invention:

1. A process for effecting the disproportionation of a mixture of hydrocarbons comprising components of higher and lower molecular weights than the desired product of intermediate molecular weight which comprises reacting said mixture at disproportionation reaction conditions in the presence of a catalyst comprising free hydrogen halide and a preformed complex of equimolar proportions of a boron trihalide and a halide salt of a metal selected from the iron group metals and the metals of the left-hand columns of groups IV, V, VI, and VII of the periodic table.

2. The process of claim 1 further characterized in that said disproportionation reaction is effected at a temperature of from about —20° to about 150° C.

3. The process of claim 2 further characterized in that said reaction is effected at a pressure sufficient to maintain the reactants and catalyst components in substantially liquid phase.

4. The process of claim 1 further characterized in that said hydrogen halide corresponds to the halide of said metal halide salt.

5. The process of claim 4 further characterized in that said complex contains a hydrogen halide in at least a 1 to 1 molar ratio of hydrogen halide to metal halide.

6. The process of claim 1 further characterized in that the weight ratio of said complex to hydrocarbon charge stock is at least 0.005 to 1.

7. The process of claim 1 further characterized in that said complex comprises boron trifluoride, a fluoride of an iron group metal and hydrogen fluoride.

8. The process of claim 7 further characterized in that said iron group fluoride is ferrous fluoride.

9. The process of claim 1 further characterized in that said mixture of hydrocarbons comprises an aliphatic hydrocarbon mixture containing components having up to about 30 carbon atoms per molecule.

10. The process of claim 1 further characterized in that said hydrocarbon mixture comprises an aromatic hydrocarbon and a polyalkyl-substituted aromatic hydrocarbon.

11. The process of claim 1 further characterized in that said hydrocarbon mixture comprises an aromatic hydrocarbon containing an alkyl group having at least 2 carbon atoms per alkyl group.

References Cited in the file of this patent

UNITED STATES PATENTS

| | | |
|---|---|---|
| 2,418,023 | Frey | Mar. 25, 1947 |
| 2,446,998 | Burk | Aug. 17, 1948 |
| 2,459,775 | Passino | Jan. 18, 1949 |
| 2,470,998 | Clarke | May 17, 1949 |
| 2,480,939 | Lee et al. | Sept. 6, 1949 |
| 2,709,193 | Clough | May 24, 1955 |
| 2,725,413 | McCaulay et al. | Nov. 29, 1955 |

FOREIGN PATENTS

| | | |
|---|---|---|
| 486,355 | Great Britain | June 2, 1938 |